United States Patent
Hasegawa et al.

Patent Number: 5,789,900
Date of Patent: Aug. 4, 1998

[54] DEVICE FOR PROTECTING A SECONDARY BATTERY FROM OVERCHARGE AND OVERDISCHARGE

[75] Inventors: Hiroyuki Hasegawa; Masafumi Hirata; Koji Sagae, all of Asaka, Japan

[73] Assignee: Fuji Photo Film Co., Ltd., Kanagawa, Japan

[21] Appl. No.: 565,818

[22] Filed: Dec. 1, 1995

[30] Foreign Application Priority Data

| Dec. 5, 1994 | [JP] | Japan | 6-300560 |
| Dec. 28, 1994 | [JP] | Japan | 6-328065 |
| Jan. 12, 1995 | [JP] | Japan | 7-003535 |
| Nov. 27, 1995 | [JP] | Japan | 7-306973 |

[51] Int. Cl.$^6$ .............................. H01M 10/46
[52] U.S. Cl. .................. 320/132; 320/134; 320/136
[58] Field of Search ............... 320/5, 8, 10, 12, 320/13, 15, 21, 30, 39, 40, 49, 132, 134, 136

[56] References Cited

U.S. PATENT DOCUMENTS

| 5,142,215 | 8/1992 | Mathison | 320/40 |
| 5,493,197 | 2/1996 | Eguchi et al. | 320/5 |
| 5,635,821 | 6/1997 | Smith | 320/40 |

FOREIGN PATENT DOCUMENTS

| 2-136445 | 11/1990 | Japan. |
| 4-33271 | 2/1992 | Japan. |
| 4-75430 | 3/1992 | Japan. |
| 4-75431 | 3/1992 | Japan. |

*Primary Examiner*—Edward Tso
*Attorney, Agent, or Firm*—Sughrue, Mion, Zinn, Macpeak & Seas, PLLC

[57] ABSTRACT

A device for protecting a secondary battery from overcharge and overdischarge has two switches and two diodes respectively connected in parallel with the switches. Each diode is conductive in the same direction as a parasitic diode included in the associated switch. When one of the switches is turned off, a current flows through the diode connected to the switch prior to the parasitic diode of the switch. This prevents a current from flowing through the switch in the opposite direction. The switches are, therefore, free from deterioration and damage and allow the protection device to surely operate without being damaged. Alternatively, a charge path and a discharge path may be connected in parallel with each other, and each may have a serial connection of a switch and a diode opposite in direction to a parasitic diode included in the switch. In this case, when one of the switches assigned to the respective paths is turned off, a current flows through the other path prior to the parasitic diode of the switch turned off.

14 Claims, 8 Drawing Sheets

DEVICE FOR PROTECTING A SECONDARY BATTERY FROM OVERCHARGE AND OVERDISCHARGE

BACKGROUND OF THE INVENTION

1. Field of the Invention

The present invention relates to a device for protecting a secondary battery from overcharge and overdischarge and, more particularly, to a device applicable to a power source unit removably mounted to a portable electronic apparatus in order to protect a secondary battery accommodated in the unit from overcharge and overdischarge.

2. Description of the Background Art

Today, various kinds of electronic apparatuses including a video cassette recorder (VCR) with a video camera, personal computer and telephone set are available with a miniature portable configuration. Most of the portable apparatuses are powered by a primary battery or a secondary battery. A secondary battery is predominant over a primary battery because it is rechargeable. The prerequisite with a power source unit implemented by a secondary battery is that it be surely protected from overcharge and overdischarge. Overcharge or overdischarge would decompose substances sealed in the secondary battery and would thereby lower the capacity of the battery. If the battery is repeatedly overcharged or overdischarged, the decrease in battery capacity is accelerated until the service life of the battery expires.

For the protection of the secondary battery from overcharge and overdischarge, it has been customary to monitor the voltage of the battery and selectively block a charge path or a discharge path. Specifically, when the battery voltage rises above a reference voltage during the course of charging, the charge path is blocked off. When the battery voltage drops below another reference voltage, the discharge path is blocked off. Japanese utility model laid-open publication No. 136445/1990, for example, teaches a protection circuit for a serial connection of a plurality of secondary or rechargeable batteries. The protection circuit, monitoring the voltage of the individual battery, blocks a charge path or a discharge path when the voltage of any one of the batteries rises above a reference voltage or drops below another reference voltage.

It is a common practice to block the charge and discharge circuits by use of semiconductor switches which are desirable from the cost and size standpoint. For example, Japanese patent laid-open publication Nos. 33271/1992, 75430/1992, and 75431/1992 each proposes a power source unit using a secondary battery, and switches implemented by FETs (Field Effect Transistors) each inherently involving a parasitic diode. Among them, the unit taught in laid-open publication No. 75430/1992 has a serial connection of first and second FETs connected to one electrode of a secondary battery. The first and second FETs are used to block a charge path and a discharge path, respectively. In this configuration, the first FET is turned on to unblock the charge path when the voltage between the opposite electrodes of the battery drops below a first voltage close to a chargeable voltage, or turned off to block it when the voltage rises to a second voltage higher than the first voltage. The second FET is turned on to unblock the discharge path when the battery voltage rises to a third voltage close to a dischargeable voltage, or turned off to block it when the battery voltage drops below a fourth voltage lower than the third voltage. When the charge path is blocked against overcharge, the parasitic diode of the first FET which becomes conductive in the opposite direction to the charging direction forms a discharge path. Also, when the discharge path is blocked against overdischarge, the parasitic diode of the second FET forms a charge path because it becomes conductive in the opposite direction to the discharging direction. Specifically, because an FET involves, due to its particular structure, a parasitic diode which allows a current to flow therethrough in the direction opposite to the blocking direction, the blocking effect available with the FET is only one-way. The above laid-open publication No. 75431/1992 positively uses this phenomenon and connects two FETs in series, but in opposite directions to each other. This kind of scheme secures a discharge path in the event of overcharge protection and secures a charge path in the event of overdischarge protection, while obviating overcharge and overdischarge.

However, when the charge path and discharge path are secured by making the most of the parasitic diodes included in the FETs, but not intended for use due to the particular structure, the FETs or switches are easy to deteriorate. This lowers the switching function of the FETs and damages the FETs in due course of time. When the switching function is lowered, the FETs fail to block the charge path or the discharge path at an adequate time. Should the FETs be continuously used in such a condition, the secondary battery would be overcharged or overdischarged, resulting in the previously stated troubles.

SUMMARY OF THE INVENTION

It is, therefore, an object of the present invention to provide a device capable of surely protecting a secondary battery from overcharge and overdischarge by obviating the deterioration and damage of switching elements.

In accordance with the present invention, a device for protecting a rechargeable secondary battery from overcharge and overdischarge has a first normally ON switch serially connected to the charge/discharge path of the secondary battery. The first switch causes a current to flow in a charging direction when turned on or blocks the charge/discharge path in the charging direction when turned off. The first switch includes a parasitic diode which is rendered conductive in a discharging direction when the first switch is turned off. A second normally ON switch is also serially connected to the charge/discharge path. The second switch causes a current to flow in the discharging direction when turned on or blocks the charge/discharge path in the discharging direction when turned off. The second switch includes a parasitic diode which is rendered conductive in the charging direction when the second switch is turned off. A controller detects the voltage of the secondary battery. The controller turns off the first switch when the voltage of the secondary battery rises above a first reference voltage higher than a predetermined voltage close to a full-charge voltage or turns off the second switch when the voltage drops below a second reference voltage lower than a predetermined voltage close to a full-discharge voltage. A first diode is connected in parallel with the first switch and conductive in the same direction as the parasitic diode of the first switch to thereby form a bypass for causing a current in the discharging direction to bypass the first switch. A second diode is connected in parallel with the second switch and conductive in the same direction as the parasitic diode of the second switch to thereby form a bypass for causing a current in the charging direction to bypass the second switch.

Also, in accordance with the present invention, a device for protecting a rechargeable secondary battery from overcharge and overdischarge has a first normally ON switch connected to the charge path of the secondary battery. The first switch causes a current to flow in a charging direction when turned on or blocks the charge path in the charging direction when turned off. The first switch includes a parasitic diode which is rendered conductive in a discharging direction when the first switch is turned off. A second normally ON switch is connected to the discharge path of the secondary battery. The second switch causes a current to flow in the discharging direction when turned on or blocks the discharge path in the discharging direction when turned off. The second switch includes a parasitic diode which is rendered conductive in the charging direction when the second switch is turned off. A controller detects the voltage of the secondary battery. The controller turns off the first switch when the voltage of the secondary battery rises above a first reference voltage higher than a predetermined voltage close to a full-charge voltage or turns off the second switch when the voltage drops below a second reference voltage lower than a predetermined voltage close to a full-discharge voltage. The charge path and discharge path branch, in parallel, from between the secondary battery and one of the input/output terminals of the paths. A first diode is serially connected to the first switch in a direction opposite to the parasitic diode of the first switch with respect to conduction. A second diode is serially connected to the second switch in a direction opposite to the parasitic diode of the second switch with respect to conduction.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
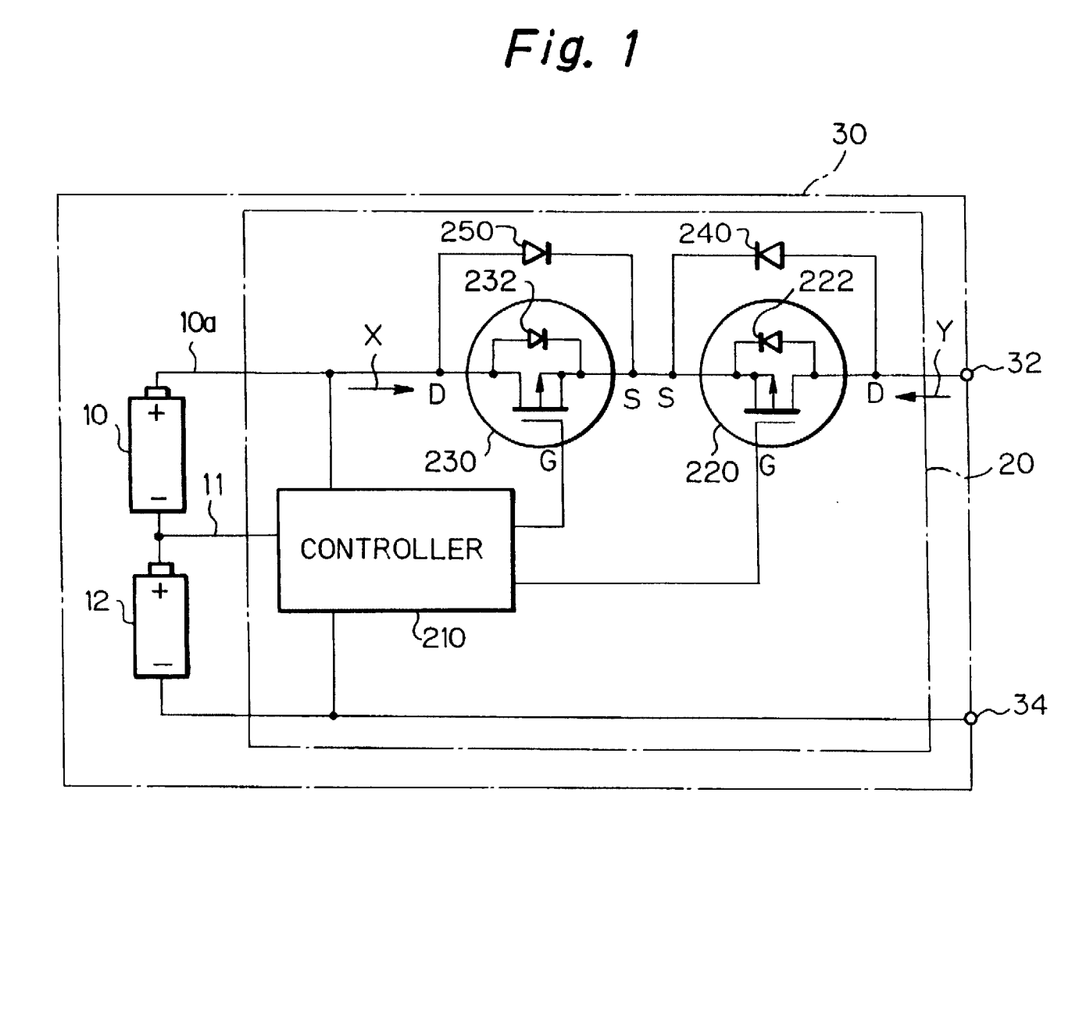
FIG. 1 is a circuit diagram showing a power source unit to which a protection device embodying the present invention is applied.

Referring to FIG. 1 of the drawings, a power source circuit to which a protection circuit embodying the present invention is applied is shown. As shown, the power source circuit is implemented as a power source unit or so-called battery pack 30 accommodating two secondary or rechargeable batteries 10 and 12 connected in series. A positive terminal 32 and a negative terminal 34 are provided on the battery pack 30 and connected to the serial connection of the batteries 10 and 12 via a protection device 20 embodying the present invention. The battery pack 30 is removably mounted to, e.g., a VCR with a video camera.

The batteries 10 and 12 may be comprised of, but not limited to, nickel-cadmium (Ni—Cd) batteries or nickel-hydrogen (Ni—H) batteries or, advantageously, lithium ion (Li$^+$) secondary batteries. Lithium ion batteries, for example, have an operating voltage ranging from 2.5 V to 4.2 V each. When the lithium ion battery is charged to a terminal voltage of above 4.3 V or so, the performance of the battery is deteriorated more than by the usual cycle deterioration. When the battery is discharged to a terminal voltage of below 2.4 V or so, the above deterioration worse than the usual cycle deterioration also occurs. Particularly, when the characteristic differs from one battery to another battery due to a production line, it is likely that the battery fully charged or discharged first is overcharged or overdischarged earlier than the other battery. Briefly, the protection device 20 detects the terminal voltage of the individual battery, implemented by lithium ion battery by way of example, 10 or 12 and blocks either a charge path or a discharge path in such a manner as to prevent one of the batteries 10 and 12 from being charged to above 4.3 V or discharged to below 2.4 V. This successfully protects the batteries 10 and 12 from overcharge and overdischarge.

Specifically, as shown in FIG. 1, the protection device 20 is made up of a controller 210, a switch 220 for blocking a discharge path, a switch 230 for blocking a charge path, and diodes 240 and 250 assigned to the charge path and discharge path, respectively. The controller 14 detects the terminal voltage of the battery 10 and that of the battery 12 independently and controls the individual battery 10 or 12 on the basis of the detected voltage.

Figure 2:
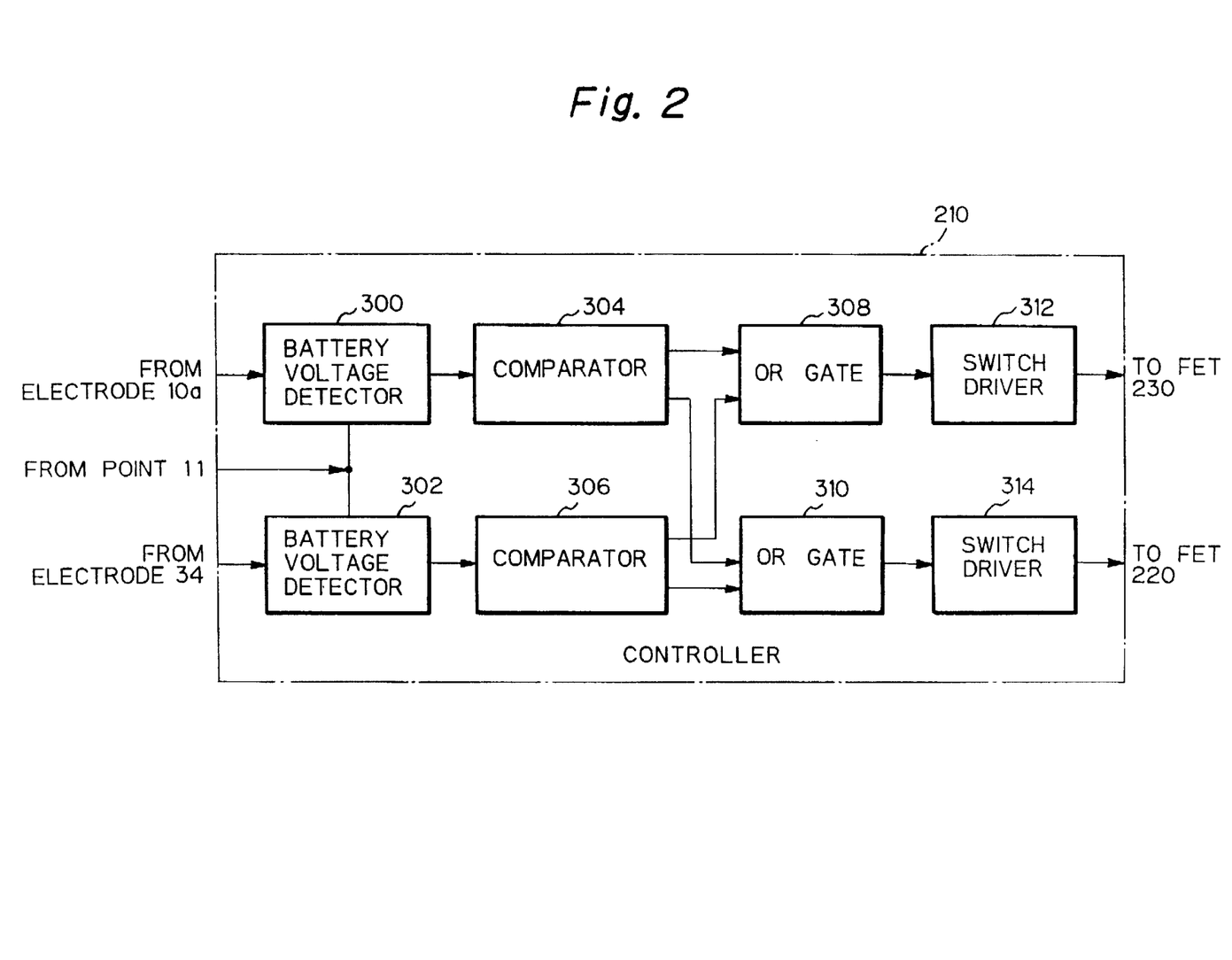
FIG. 2 is a schematic block diagram showing a specific construction of a controller included in the embodiment.

FIG. 2 shows a specific configuration of the controller 14. As shown, the controller 14 has a first battery voltage detector 300, a second battery voltage detector 302, a first comparator 304, a second comparator 306, a first OR gate 308, a second OR gate 310, a first switch driver 312, and a second switch driver 314. The first battery voltage detector 300 is connected to a positive electrode 10a and a negative electrode 11 included in the battery 10 so as to detect a difference between the potentials of the electrodes 10a and 11. The output voltage of the voltage detector 300 representative of the difference is applied to the comparator 304. Likewise, the second battery voltage detector 302 is connected to the positive electrode 11 and negative electrode 34 of the other battery 12, and feeds a voltage representative of a difference between the potential of the electrode 11 and that of the terminal 34 to the comparator 306. As shown in FIG. 1, the potential from the negative electrode of the battery 10 and the potential from the positive electrode of the battery 12 are commonly fed to the voltage detectors 300 and 302. The voltage detectors 300 and 302 each detects a difference between the common potential and the potential from the other electrode of the respective battery 10 or 12.

The comparator 304, having one input and two outputs, determines whether or not the output voltage of the voltage detector 300 is higher than a first preselected reference voltage or lower than a second preselected reference voltage. The comparator 306 is identical in configuration with the comparator 304 and determines whether or not the output voltage of the voltage detector 302 is higher than the first reference voltage or lower than the second reference voltage. For each of the comparators 304 and 306, the first reference voltage is selected to be close to the full-charge voltage of the battery 10 or 12; assuming the previously mentioned lithium ion battery, it ranges from about 4.2 V to about 4.3 V, but lower than 4.3 V. The second reference voltage is selected to be close to the full-discharge voltage of the battery 10 or 12; in the case of a lithium ion battery, it ranges from about 2.4 V, but higher than 2.4 V, to about 2.5 V. The full-discharge voltage is referred to the voltage developed by a battery when completely discharged. In this condition, the comparators 304 and 306 each produces a first and a second output respectively representative of the results of comparison using the first and second reference values. The first outputs of the comparators 304 and 30 are applied to the OR gate 308 while the second outputs of the same are applied to the OR gate 310.

The OR gate 308 produces an OR of the first outputs of the comparators 304 and 306. When the output of either one of the comparators 304 and 306 is representative of a voltage higher than the first reference voltage, the OR gate 308 feeds a valid output to the switch driver 312. Likewise, the OR gate 310 ORs the second outputs of the comparators 304 and 306 to see if the output of either one of the comparators 304 and 306 is representative of a voltage lower than the second reference voltage. If the result of this decision is positive, the OR gate 310 delivers a valid output to the switch driver 314.

The switch driver 312 is a voltage generating circuit which generates a signal for selectively turning on or turning off the switch 230 in response to the logical output of the OR gate 308. The switch driver 314 is identical with the switch driver 312 except that it generates a signal for selectively turning on or turning off the switch 220 in response to the logical output of the OR gate 310.

Referring again to FIG. 1, the switch 230 for blocking the charge path is a semiconductor switch implemented by, e.g., a CMOS (Complementary Metal-Oxide Semiconductor) FET operable at a low voltage. The switch 230 normally remains turned on. In response to a control voltage output from the controller 210, the switch 230 is turned off to shut off a current flowing in a charging direction, as indicated by an arrow Y in FIG. 1. Advantageously, the switch 230 is comprised of a normally OFF P-channel enhancement type FET. The switch 230 has a drain D connected to the positive electrode 10a of the battery 10 and has a source S connected to the input/output terminal 32. The control voltage from the controller 210 is applied to the gate G of the switch 230. The FET 230 involves a parasitic diode 232 due to its particular structure. When the FET 230 is turned off, the parasitic diode 232 would cause a current to flow between the source S and the drain D in the direction opposite to the blocking direction, i.e., a discharging direction X opposite to the charging direction Y.

The switch 220 for blocking the discharge path is also a semiconductor switch implemented by, e.g., a normally OFF P-channel enhancement type FET. The switch 220 is connected in series between the switch 230 and the input/output terminal 32. The switch 220 normally remains in its ON or conductive state and allows a current to flow in both the charging direction Y and the discharging direction X. When the switch 220 is turned off by a control voltage fed from the controller 210, it shuts off the current to flow in the discharging direction X. Specifically, the switch 220 has a drain D connected to the input/output terminal 32 and has a source S connected to the source S of the switch or FET 220. The control signal form the controller 210 is applied to the gate G of the FET 220. The FET 220 involves a parasitic diode 222 due to its particular structure. When the FET 220 is turned off, the parasitic diode 222 would allow a current to flow from the drain D to the source S of the FET 220, i.e., in the charging direction Y.

The diode 240 assigned to the charge path is connected in parallel with the switch 220. When the switch 220 is turned off, the diode 240 allows a current to flow therethrough in the same direction as through the parasitic diode 222 while bypassing the diode 222, i.e., the switch 220. The diode 240 may advantageously be implemented by a Schottky barrier diode. However, in the illustrative embodiment, the diode 240 should only be turned on at a lower voltage than the parasitic diode 222 of the FET 220 when the FET 220 is turned off. In this sense, the Schottky barrier diode may be replaced with, e.g., a point contact diode using germanium for a pellet. On the other hand, the diode 250 assigned to the discharge path is connected in parallel with the switch 230. When the switch 230 is turned off, the diode 250 allows a current to flow therethrough in the same direction as through the parasitic diode 232 while bypassing the switch 230. The diode 250, like the diode 240, may advantageously be implemented by a Schottky diode or a germanium diode.

The operation of the illustrative embodiment will be described hereinafter. Assume that the battery pack 30 is mounted to a VCR with a video camera or similar portable electronic apparatus, not shown, and has the terminals 32 and 34 thereof connected to circuitry built in the apparatus. To charge the batteries 10 and 12, the apparatus has, e.g., a cord thereof connected to an AC power source. As a result, a charge current is fed from the AC power source to the pack 30 via a charging circuit included in the apparatus and the terminals 32 and 34 of the pack 30. Specifically, the controller 210 constantly monitors the voltages of the batteries 10 and 12. If the voltages of the batteries 10 and 12 lie in the previously stated range, a negative control voltage is fed from the controller 210 to the switches 220 and 230, thereby maintaining them in an ON state. Hence, the charge current Y is fed from the terminal 32 to the batteries 10 and 12 via the switches 220 and 230 in the charging direction Y. Further, the charge current flows out of the pack 30 to the apparatus via the terminal 34. In this condition, the batteries 10 and 12 are each charged by the charge current.

Assume that either the battery 10 or the battery 12 fully charged by the above current is further charged. Then, the fully charged battery 10 or 12 reaches the upper limit of the allowable recharging condition earlier than the other battery. For example, assume that the battery 10 has reached the upper limit, causing the voltage detector 300 to output a voltage of, e.g., 4.2 V. Then, the comparator 304 detects such a rise of the voltage and feeds a valid output to the OR gate 308. At this instant, assume that the voltage detector 302 determines that the voltage of the other battery 12 is lower than 4.2 V, and causes the comparator 306 to feed an invalid output to the OR gate 308. However, the OR gate 308 delivers a valid output to the switch driver 312 due to the valid output of the comparator 304. In response, the switch driver 312 feeds a positive control voltage to the gate G of the FET 230.

Consequently, the current between the source S and the drain D of the FET 230 and, therefore, the current coming in through the terminal 32 in the charging direction Y is blocked. This prevents the battery 10 from being overcharged. When the pack 30 in this condition is used, a discharge current tends to flow from the positive electrode 10a of the battery 10 in the direction in which the parasitic diode 232 of the switch 230 is conductive. However, because the conduction voltage of the diode 250 connected in series with the switch 230 is lower than the conduction voltage of the parasitic diode 232, the diode 250 is rendered conductive prior to the diode 232. As a result, the discharge current flows to the terminal 32 via the diode 250 and switch 220, bypassing the switch 230. This successfully prevents the parasitic diode 232 from being rendered conductive.

Subsequently, when the voltage of the battery 10 drops below 4.2 V, the controller 210 detects it and delivers a negative control voltage to the switch 230 so as to turn it on.

In this condition, the discharge current is caused to flow through the switch 230 with the result that the diode 250 is rendered nonconductive.

Assume that the operator of the electronic apparatus turns on a power switch provided on the apparatus with the intention of using it. Then, the batteries 10 and 12 feed their power to the apparatus via the protection device 20. If the output voltages of the batteries 10 and 12 lie in the allowable range, the controller 210 delivers a negative control voltage to the switches 220 and 230 and thereby maintains them in the ON state thereof. Hence, a discharge current flows from the positive electrode 10a of the battery 10 to the apparatus via the switches 230 and 220 and terminal 32. Further, the current coming in through the terminal 34 from the apparatus flows to the battery 12 in the discharging direction X.

In the above condition, assume that the battery pack 30 is mounted to a VCR with a video camera, that the batteries 10 and 12 are lithium ion batteries, and that the VCR is continuously operated for more than 1 hour. Then, the voltages of the batteries 10 and 12 drop below 3.0 V each. As the operation of the VCR is further continued, one of the batteries 10 and 12 approaches the allowable limit of discharge. For example, assume that the battery 10 approaches the allowable limit of discharge and causes the voltage detector 300 to output a voltage of 2.6. Then, the comparator 304 detects the above voltage drop and delivers a valid output thereof to the OR gate 310. At this instant, although the voltage of the battery 12 may not have dropped to, e.g., 2.6, as determined by the voltage detector 302, and the comparator 306 may deliver an invalid output to the OR gate 310, the OR gate 310 feeds a valid output to the switch driver 314 due to the valid output of the comparator 304. Consequently, the switch driver 314 delivers a positive control voltage to the gate G of the switch or FET 220.

The positive control voltage from the switch driver 314 shuts off the current between the drain D and the source S of the FET 220 and, therefore, the current from the batteries 10 and 12 flowing in the discharging direction X. When the pack 30 brought to this condition is charged via the VCR, the current in the charging direction Y tends to flow from the negative electrode 11 of the battery 10 to the terminal 34 via the battery 12, and then from the terminal 32 to the positive electrode 10a of the battery 10 via the parasitic diode 222 of the switch 220 and the switch 230 which are in an OFF or non-conductive state and an ON state, respectively. However, because the conduction voltage of the diode 240 connected in parallel with the switch 220 is lower than the conduction voltage of the parasitic diode 222, the diode 240 is rendered conductive prior to the parasitic diode 222. As a result, the current flows through the diode 240 to the battery 10, bypassing the switch 220. This prevents the parasitic diode 222 from being rendered conductive. When the voltage of the battery 10 being charged rises above 2.6, the controller 210 detects it and delivers a negative control voltage to the switch 220 so as to turn it on. Consequently, the charge current is caused to flow through the switch 220 while the diode 240 is rendered nonconductive.

Figure 8:
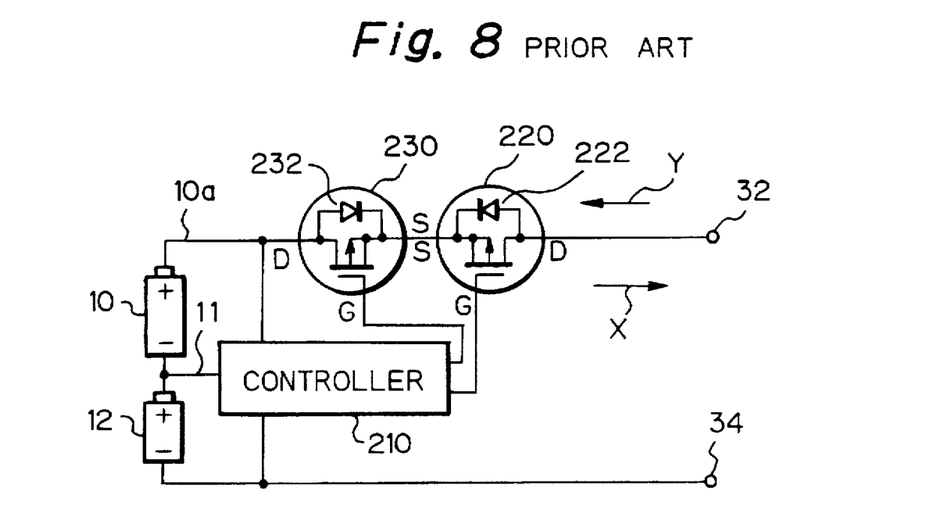
FIG. 8 is a circuit diagram showing a conventional protection circuit for comparison with the present invention.

A reference will be made to FIG. 8 for describing a conventional protection device in order to clear up the advantages of the above embodiment. In FIG. 8, the same or similar constituents as or to the constituents shown in FIG. 1 are designated by the same reference numerals, and a detailed description thereof will not be made in order to avoid redundancy. As shown, the conventional device lacks the diodes 240 and 250. In operation, when a controller 210 determines that one of two batteries 10 and 12 has been fully charged, it turns off a switch 230. As a result, a current in a charging direction Y is shut off; a discharge current X flows to a terminal 32 via a parasitic diode 232 included in the switch 230 and a switch 220 which are in an OFF state and an ON state, respectively. In the event of discharge, the switch 220 is turned off when the battery 10 or 12 approaches the limit of discharge. This shuts off the discharge current X and, at the same time, causes the charge current Y to flow from the terminal 32 to the batteries 10 and 12 via the parasitic diode 222 of the switch 220 and the switch 230 which are in an OFF state and an ON state, respectively. In this manner, a current flows through the parasitic diode 222 or 232 when the switch 220 or 230 is turned off. Such currents, different from the expected currents, deteriorate the switching characteristic of the switches 220 and 230 and damage the switches 220 and 230 in due course of time.

By contrast, in the illustrative embodiment, the diodes 240 and 250 connected in parallel with the switches 220 and 330, respectively, are each rendered conductive at a lower voltage than the associated parasitic diode 222 or 232, thereby forming a bypass. Therefore, when the switch 220 or 230 is turned off, the parasitic diode 222 or 232 associated therewith is free from a current otherwise flowing in the direction opposite to the blocking direction. This successfully prevents the switching characteristic from being deteriorated and the switch itself from being damaged.

The embodiment has another advantage over the conventional device shown in FIG. 8, as follows. In FIG. 8, the parasitic diode 222 is rendered conductive when the batteries 10 and 12 are charged, while the parasitic diode 232 is rendered conductive when they are discharged. Generally, the parasitic diode of an FET has a forward drop voltage $V_F$ which is as high as, e.g., 0.6 V to 0.7 V. As a result, the diodes 222 and 232 shown in FIG. 8 consume power due to their high drop voltage $V_F$. In the event of charging, the batteries 10 and 12 cannot be charged with a sufficient voltage while, in the event of discharging, they cannot feed power to a load with a sufficient voltage. Moreover, the high drop voltage $V_F$ is apt to cause the FETs 222 and 232 to generate heat.

In the illustrative embodiment, the diodes 240 and 250 are respectively connected in parallel with and with the same polarity as the parasitic diodes 222 and 232 which have the high voltage drop $V_F$, as mentioned above. This prevents the parasitic diodes 222 and 232 from being rendered conductive when the batteries 10 and 12 are charged or discharged. In addition, the diodes 240 and 250 are implemented by Schottky barrier diodes or similar elements lower in forward drop voltage $V_f$ than the parasitic diode 222 and 232. Usually, a Schottky diode has a forward drop voltage $V_F$ as low as about 0.4 V. Hence, the diode 240 or 250 consumes a minimum of power in the event of charging or discharging. As a result, the batteries 10 and 12 can be charged with a sufficient voltage and can feed power to a load with a sufficient voltage. Further, the FETs 222 and 232 generate a minimum of heat because the parasitic diodes 222 and 232 having a high voltage drop $V_F$ are not rendered conductive. Because the parasitic diodes 222 and 232 are too unstable to be positively used, omitting them enhances the reliability of the entire pack 30 in combination with the minimum heat generation.

Figure 3:
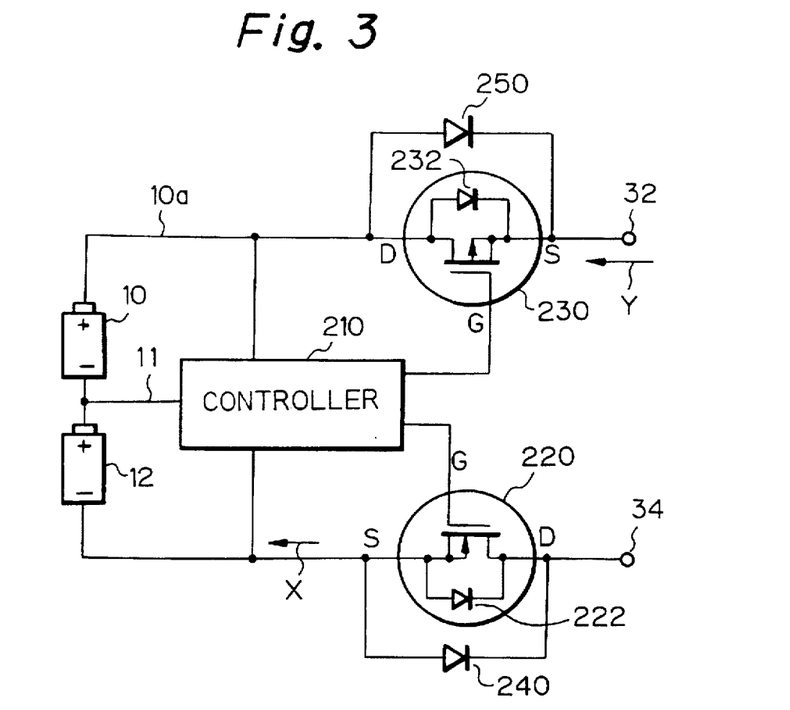
FIG. 3 is a circuit diagram showing an alternative embodiment of the present invention.

Referring to FIG. 3, an alternative embodiment of the present invention will be described. This embodiment differs from the embodiment shown in FIG. 1 in that the switch 230 for blocking the charge path and the diode 250 assigned to the discharge path are connected to the positive terminal 32, and in that the switch 220 for blocking the discharge path and the diode 240 assigned to the charge path are connected to the negative terminal 34. With that alternative embodiment, the switch 220 is advantageously an N-channel FET. In FIG. 3 and successive figures, the same or similar constituents as or to the constituents shown in FIG. 1 are designated by the same reference numerals.

As shown in FIG. 3, the switches 220 and 230 opposite in direction to each other are not directly connected in series. This eliminates an occurrence that when the controller 210 turns off one of the switches 220 and 230, the resulting extremely high momentary voltage is applied to the other switch and renders the parasitic diode thereof conductive. For example, when the switch 230 shown in FIG. 1 is turned off, the current Y flowing from the drain D to the source S of the switch 220 is blocked with the result that a discharge current opposite in direction to the above current tends to flow. At this time, the voltage between the drain D and the source S and tending to momentarily shut off the current in the discharge direction is apt to temporarily turn on the parasitic diode 222 which is conductive in the charging direction. This brings about a problem that when one of the switches 220 and 230 is repeatedly turned on and turned off, the switching characteristic of the other switch is deteriorated. The embodiment shown in FIG. 3 reduces the influence of the operation of one of the switches 220 and 230 on the other switch due to the batteries 10 and 12 intervening between the switches 220 and 230.

While in the above embodiments the battery pack 30 is assumed to be mounted to a VCR with a video camera, it may, of course, be mounted to any other electronic apparatus. A lithium ion battery is merely a specific form of a secondary or rechargeable battery with which the present invention is practicable. The first and second reference voltages will, therefore, be varied in matching relation to the characteristic of the secondary battery selected. Further, FETs playing the role of switching elements may be replaced with any other electronic switches.

Figure 4:
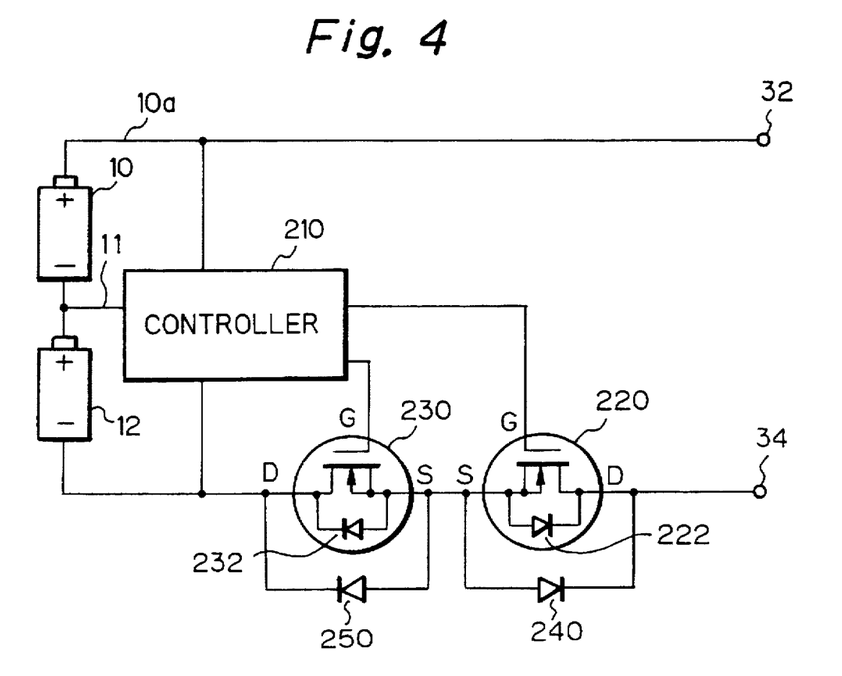
FIGS. 4, 5, 6 and 7 are circuit diagrams each showing a particular modified form of the embodiment shown in FIG. 1 or 3.
Figure 5:
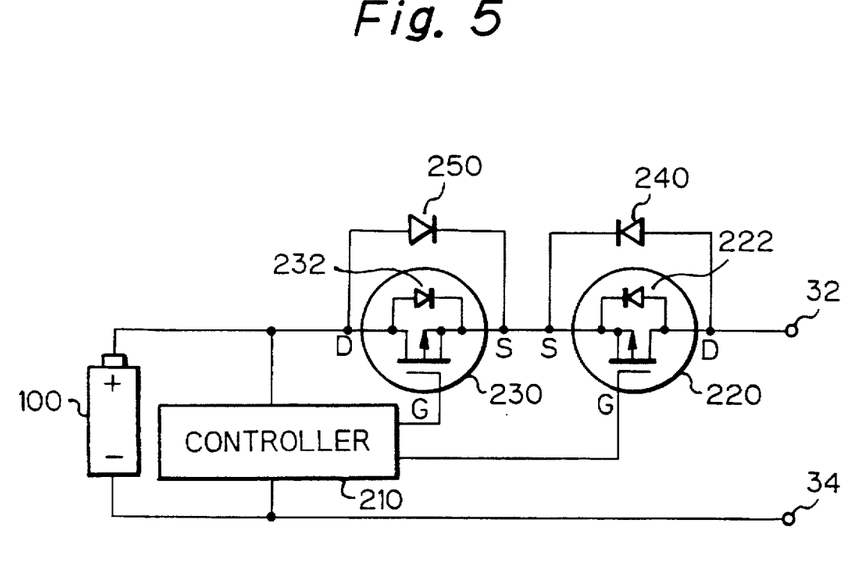

In the embodiment shown in FIG. 1, the switches 220 and 230 and their associated diodes 240 and 250 are connected to the positive terminal 32. Alternatively, as shown in FIG. 4, the switches 220 and 230 and diodes 240 and 250 may be connected to the negative terminal 34. With the latter embodiment, both of the switches 220 and 230 are advantageously N-channel FETs. Further, the present invention is, of course, practicable even with a single battery, as shown in FIG. 5.

Figure 6:
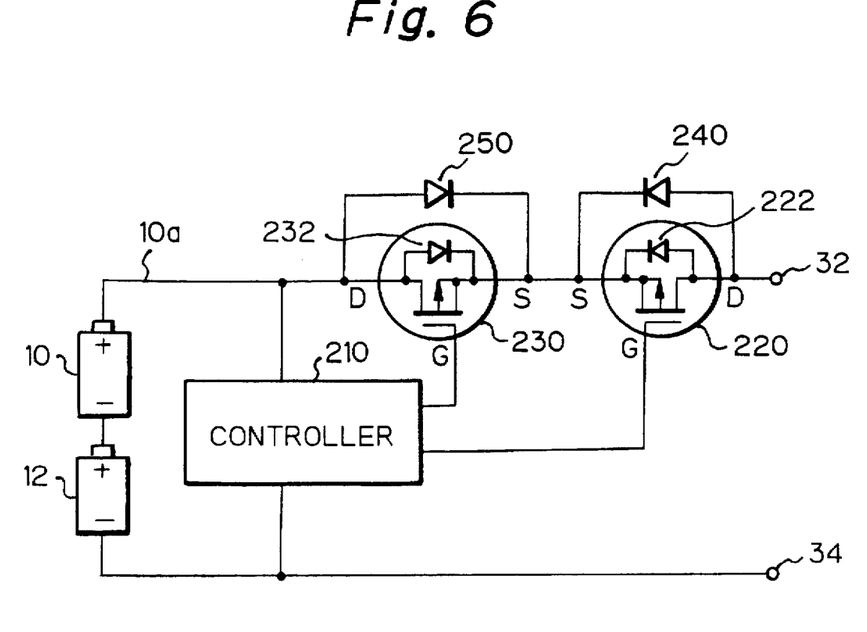
Figure 7:
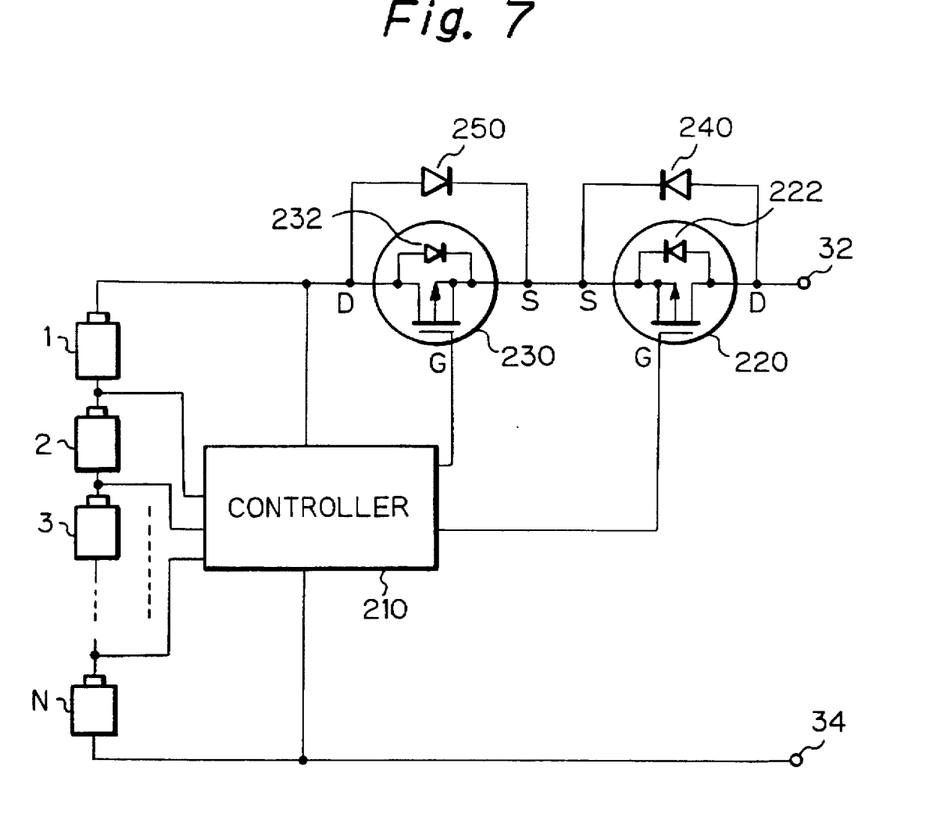

While the embodiments shown and described detect the terminal voltage of each the batteries 10 and 12, an arrangement may be so made as to detect voltages appearing on the opposite ends of the serial connection of the batteries 10 and 12, as shown in FIG. 6. In addition, the present invention is effective even when N (3 or greater natural number) batteries are connected in series, as shown in FIG. 7.

As stated above, the embodiments shown and described each has switches and diodes respectively connected in parallel with the switches and each being identical in direction with a parasitic diode included in the associated switch. Hence, when one of the switches is turned off, a current flows through the diode connected to the switch prior to the parasitic diode of the switch. This prevents a current from flowing through the switch in the opposite direction. The switches are, therefore, free from deterioration and damage and allow the protection device to surely operate without being damaged.

Figure 9:
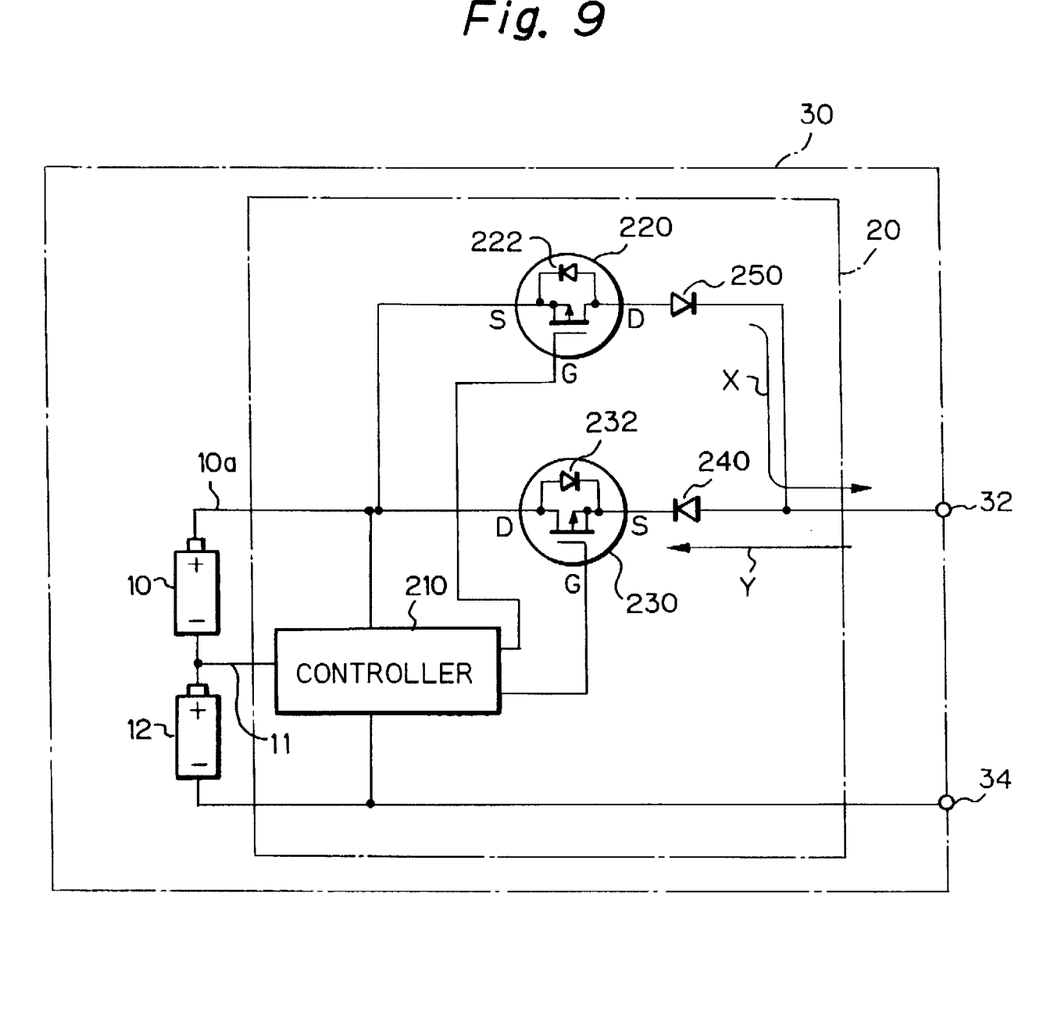
FIG. 9 is a circuit diagram showing another alternative embodiment of the present invention.

FIG. 9 shows another alternative embodiment of the protection device in accordance with the present invention.

As shown, the protection device 20 has the switch 230 for blocking a charge path, switch 220 for blocking a discharge path, and diodes 240 and 250 assigned to the charge path and discharge path, respectively. The switch 230 is implemented by a CMOS FET or similar semiconductor switch operable at a low voltage. The switch 230 and diode 240 form the charge path in combination. The switch 230 is advantageously comprised of a normally OFF P-channel enhancement type FET which remains in an ON state in response to a negative voltage. The switch 230 usually remains in an ON state to allow a current in a charging direction Y to flow therethrough. On receiving a positive control voltage from the controller 210, the switch 230 is turned off to thereby shut off the current in the charging direction Y. Specifically, as shown in FIG. 9, the switch or FET 230 has a drain D connected to the positive electrode 10a of the battery 10 and has a source S connected to the input/output terminal 32 via the diode 240. The control voltage from the controller 210 is applied to the gate G of the switch 230. A parasitic diode 232 is included in the FET 230 due to the particular structure of the FET 230. When the FET 230 is turned off, the parasitic diode 232 would cause a current to flow between the source S and the drain D in a direction opposite to the blocking direction, i.e., in a discharging direction.

The switch 220 is also a semiconductor switch implemented by, e.g., a normally OFF P-channel enhancement type FET. The switch 220 and diode 250 form the discharge path in combination. The switch 220 is parallel to the charge path, i.e., the serial connection of the switch 230 and diode 240, but opposite in direction to the switch 230. Usually, the switch 220 remains in an ON state and allows a current to flow in a discharging direction X. When the switch 220 is turned off, it blocks the current in the discharging direction X. Specifically, the switch 220 has a source S connected to the positive electrode 10a of the battery 10 and a drain D connected to the input/output terminal 32. The control signal from the controller 210 is applied to the gate G of the FET 220. A parasitic diode 222 is included in the FET 220 due to the particular structure of the FET 220. The parasitic diode 222 functions such that when the FET 220 is in an OFF state, a current would flow from the drain D to the source S, i.e., in the charging direction.

On the other hand, the diode 240 is serially connected to the switch 230 which functions to block the charge path. The diode 240 allows a current to flow therethrough in the charging direction Y when turned on, or shuts it off when turned off. The diode 240 may advantageously be implemented by, e.g., a Schottky barrier diode, germanium diode, or silicon diode. On the turn-off of the switch 230, the diode 240 prevents a current from flowing through the parasitic diode 232. Likewise, the diode 250 is serially connected to the switch 220. The diode 250 allows a current to flow therethrough in the discharging direction X when turned on, or shuts it off when turned off so as to prevent a current from flowing through the parasitic diode 222.

The operation of this embodiment will be described hereinafter. Assume that the power source unit or battery pack 30 is mounted to a portable electronic apparatus, not shown, and has the terminals 32 and 34 thereof connected to circuitry built in the apparatus. To charge the batteries 10 and 12, the apparatus has, e.g., a cord thereof connected to an AC power source. As a result, a charge current is fed from the AC power source to the pack 30 via a charging circuit included in the apparatus and the terminals 32 and 34 of the pack 30. Specifically, the controller 210 constantly monitors the voltages of the batteries 10 and 12. If the voltages of the batteries 10 and 12 lie in the previously stated range, a negative control voltage is fed from the controller 210 to the switches 230 and 220, thereby maintaining them in an ON state. Hence, the charge current is fed from the terminal 32 to the batteries 10 and 12 via the diode 240 and switch 230 in the charging direction Y. Further, the charge current flows out of the pack 30 to the apparatus via the terminal 34 in the charging direction Y. In this condition, the batteries 10 and 12 are each charged by the charge current.

Assume that either the battery 10 or the battery 12 fully charged by the above current is further charged. Then, the fully charged battery 10 or 12 reaches the upper limit of the allowable recharging condition earlier than the other battery. For example, when the battery 10 reaches the upper limit, i.e., the positive electrode 10a thereof reaches, e.g., 4.2 V to 4.3 V, the controller 210 feeds a positive control voltage to the gate G of the FET 230. In response, the current between the drain D and the source D of the FET 230 and, therefore, the current coming in through the terminal 32 in the charging direction Y is shut off. This prevents the battery 10 from being overcharged. When the apparatus with the pack 30 is operated, the discharge current flows from the positive electrode 10a of the battery 10 to the terminal 32 via the switch 220 which is in an ON state and the diode 250, and from the terminal 32 to the apparatus. At this instant, a current in the discharging direction X tends to flow through the parasitic diode 232 of the switch 230. However, the current from the parasitic diode 232 is blocked because the diode 240 serially connected to the switch 230 is opposite in direction to the diode 232.

When the FET 230 blocks the charge current due to the rise of the voltage of the battery 10 to the upper limit, the voltage of the battery 10 begins to drop due to the impedance inside of the battery 10 or the leveling of ion density inside of the battery 10. When the voltage of the battery 10 drops below 4.2 V, the controller 210 detects it and delivers a negative control voltage to the switch 230. As a result, the switch 230 is turned on and allows the batteries 10 and 12 to be again charged via the diode 240.

Assume that a power switch provided on the electronic apparatus is turned on in order to operate the apparatus. Then, the batteries 10 and 12 feed their power to the apparatus via the protection device 20. If the output voltages of the batteries 10 and 12 lie in the allowable range, the controller 210 delivers a negative control voltage to the switches 220 and 230 and thereby maintains them in an ON state. Hence, a discharge current flows from the positive electrode 10a of the battery 10 to the apparatus via the switch 220, diode 250, and terminal 32. Further, the current coming in through the terminal 34 from the apparatus flows to the battery 12 in the discharging direction. In this condition, the batteries 10 and 12 are sequentially discharged.

In the above condition, assume that the battery pack 30 is mounted to a VCR with a video camera, that the batteries 10 and 12 are lithium ion batteries, and that the VCR is continuously operated for more than 1 hour. Then, the voltages of the batteries 10 and 12 drop below 3.0 V each. As the operation of the VCR is further continued, one of the batteries 10 and 12 approaches the allowable limit of discharge. For example, when the battery 10 approaches the allowable limit of discharge and causes a voltage 2.4 V to 2.5 V to appear on the positive electrode 10a, the controller 210 feeds a positive control voltage to the gate G of the FET 220. As a result, the current between the drain D and the source S of the FET 220 and, therefore, the current flowing from the batteries 10 and 12 in the discharging direction X is blocked. When the pack 30 in the above condition is charged, a current in the charging direction flows from the negative electrode 10a of the battery 10 to the terminal 34 via the battery 12 and then from the terminal 32 to the positive electrode 10 via the diode 240 and switch 230 which is in an ON state. At this instant, the current in the charging direction Y also tends to flow through the parasitic diode 222 of the switch 220. However, because the diode 250 serially connected to the parasitic diode 222 is opposite in direction to the diode 222, the above current tending to flow through the diode 222 is blocked. Subsequently, when the voltage of the battery 10 exceeds 2.4 V, the controller 210 detects it and delivers a negative control voltage to the switch 220. The control voltage turns on the switch 220 and thereby sets up a dischargeable state, i.e., prevents overcharge from occurring.

In the above embodiment, the diodes 250 and 240 are respectively connected to the switches 220 and 230 in series, and each allows a current to pass therethrough only in one direction. The serial connections of the diodes 250 and 240 and switches 220 and 230 are parallel to each other. In this configuration, when one of the switches 220 and 230 is turned off, a current opposite in direction to the blocking direction of the switch 220 or 230 is prevented from flowing through the associated diode 222 or 232. This successfully protects the switching characteristic of the switches 222 and 232 from deterioration and thereby protects the switches 222 and 232 from damage. In addition, there can be obviated the power consumption of the parasitic diodes 222 and 232 as well as the generation of heat and the fall of reliability attributable thereto.

Figure 10:
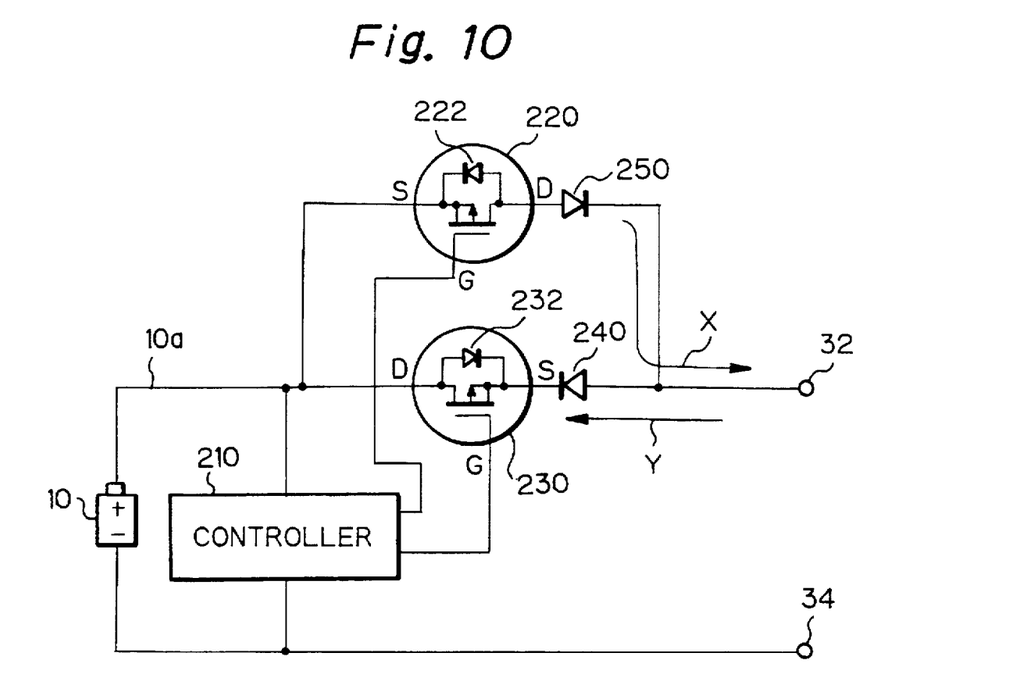
FIGS. 10, 11, 12 and 13 are circuit diagrams each showing a particular modified form of the embodiment shown in FIG. 9.
Figure 11:
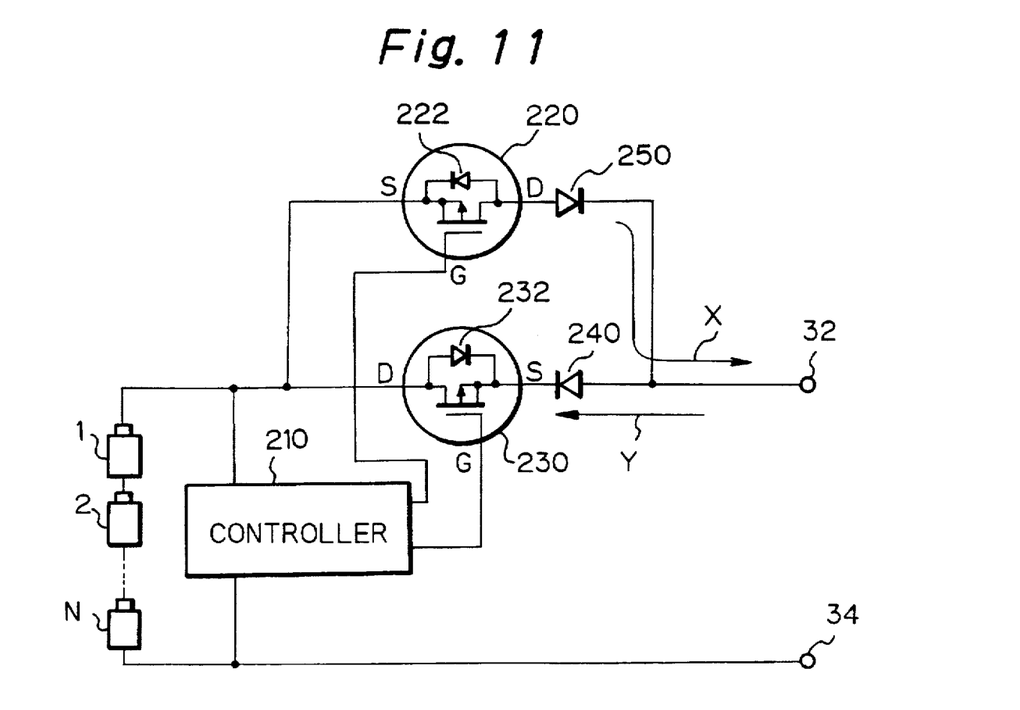

While the above embodiment has been shown and described in relation to two batteries 10 and 12, it is, of course, practicable even with a single battery, as shown in FIG. 10. Although the embodiment detects the terminal voltage of each of the batteries 10 and 12, an arrangement may be so made as to detect voltages appearing on the opposite ends of the serial connection of the batteries 10 and 12, as shown in FIG. 11.

Figure 12:
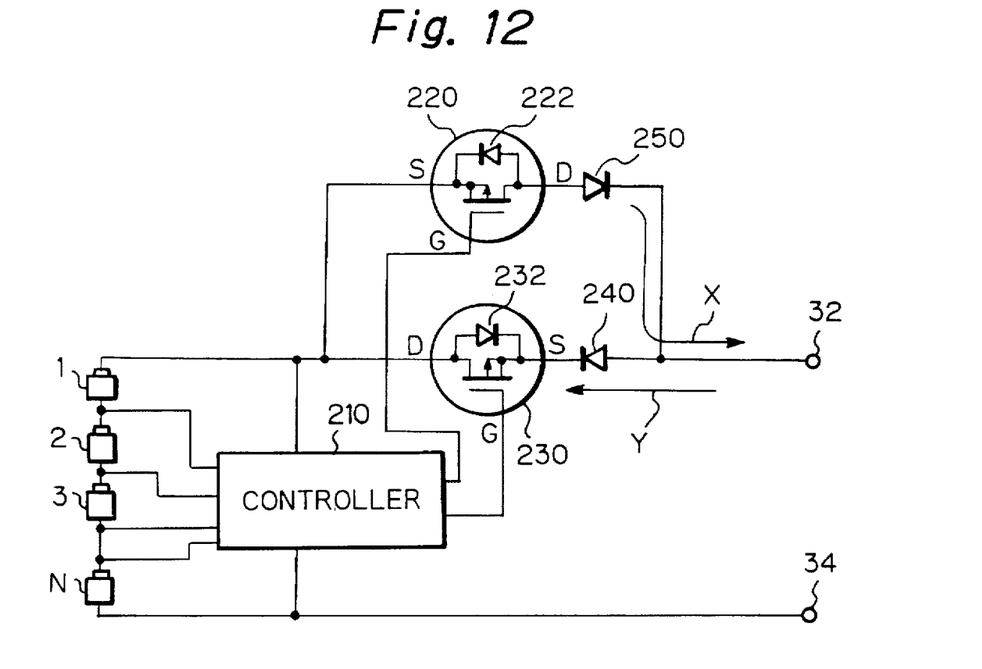
Figure 13:
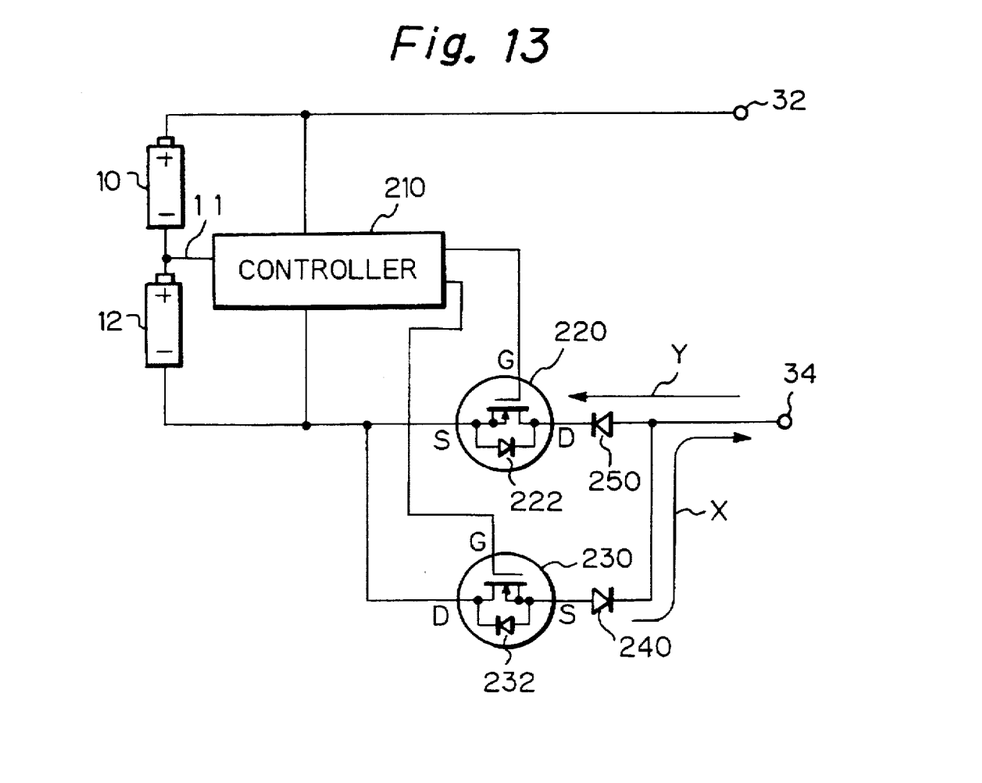

Further, as shown in FIG. 12, the embodiment may be modified to detect the voltage of each of N (3 or greater natural number) batteries and controls the switch 220 or 230 on determining that any one of such voltages has risen above the upper limit or has dropped below the lower limit. In addition, the switches 220 and 230 and their associated diodes 250 and 240 are shown as being connected to the positive terminal 32. Alternatively, as shown in FIG. 13, the switches 220 and 230 and diodes 240 and 250 may be connected to the negative terminal 34.

In summary, in the above illustrative embodiment, a charge path and a discharge path are connected in parallel with each other, and each has a serial connection of a switch and a diode opposite in direction to a parasitic diode included in the switch. Hence, when one of the switches assigned to the respective paths is turned off, a current flows through the other path prior to the parasitic diode of the switch turned off, i.e., a current is prevented from flowing through the switch in the opposite direction. This protects the switches and, therefore, the battery pack from deterioration and damage and thereby promotes safety charging and discharging. In addition, there can be obviated the power consumption of the parasitic diodes as well as the generation of heat and the fall of reliability attributable thereto.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A device for protecting a rechargeable secondary battery from overcharge and overdischarge, comprising:

first normally ON switching means serially connected to a charge/discharge path of the secondary battery, and for causing a current to flow in a charging direction when turned on or blocking said charge/discharge path in the charging direction when turned off, said first switching means including a parasitic diode having a polarity so as to permit conduction in a discharging direction when said first switching means is turned off;

second normally ON switching means serially connected to a charge/discharge path of the secondary battery, and for causing a current to flow in the discharging direction when turned on or blocking said charge/discharge path in the discharging direction when turned off, said second switching means including a parasitic diode having a polarity so as to permit conduction in a charging direction when said second switching means is turned off;

control means for detecting a voltage of the secondary battery, and turning off said first switching means when said voltage of the secondary battery rises above a first reference voltage higher than a predetermined voltage close to a full-charge voltage or turning off said second switching means when said voltage of the secondary battery drops below a second reference voltage lower than a predetermined voltage close to a full-discharge voltage;

a first diode connected in parallel with said first switching means and conductive in a same direction as said parasitic diode of said first switching means wherein said first diode is a bypass for causing a current in the discharging direction to bypass said first switching means; and a second diode connected in parallel with said second switching means and conductive in a same direction as said parasitic diode of said second switching means wherein said first diode is a bypass for causing a current in the charging direction to bypass said second switching means.

2. A device in accordance with claim 1, wherein said first switching means and said second switching means each comprises a semiconductor switch while said first diode and said second diode each comprises a semiconductor device which is rendered conductive at a lower voltage than said parasitic diode of the respective switching means.

3. A device in accordance with claim 2, wherein said first switching means and said second switching means each comprises an FET (Field Effect Transistor) while said first diode and said second diode each comprises a Schottky barrier diode.

4. A device in accordance with claim 2, wherein said first switching means and said second switching means each comprises an FET while said first diode and said second diode each comprises a germanium diode.

5. A device in accordance with claim 1, wherein the secondary battery comprises a serial connection of a plurality of secondary batteries, and wherein said control means, monitoring respective voltages across each of the individual secondary batteries, turns off said first switching means when the respective voltage across any one of said plurality of secondary batteries rises above said first reference voltage or turns off said second switching means when the respective voltage across any one of said plurality of secondary batteries drops below said second reference voltage.

6. A device in accordance with claim 1, wherein the secondary battery comprises a serial connection of a plurality of secondary batteries, and wherein said control means, monitoring a voltage across said serial connection, turns off said first switching means when said voltage across said serial connection rises above said first reference voltage or turns off said second switching means when said voltage across said serial connection drops below said second reference voltage.

7. A device in accordance with claim 1, wherein said control means, monitoring said voltage of the secondary battery, turns off said first switching means when said voltage of the secondary battery rises above said first reference voltage or turns off said second switching means when said voltage of the secondary battery drops below said second reference voltage.

8. A device in accordance with claim 1, wherein said first switching means, said first diode, said second switching means and said second diode are located on only one of a positive part and a negative part of said charge/discharge path with respect to the secondary battery.

9. A device in accordance with claim 1, wherein said first switching means and said first diode are located on one of a positive part and a negative part of said charge/discharge path with respect to the secondary battery, while said second switching means and said second diode are provided on the other part of said charge/discharge path.

10. A device for protecting a rechargeable secondary battery from overcharge and overdischarge, comprising:

first normally ON switching means connected to a charge path of the secondary battery, and for causing a current to flow in a charging direction when turned on or blocking said charge path in the charging direction when turned off, said first switching means including a parasitic diode having a polarity so as to permit conduction in a discharging direction when said first switching means is turned off;

second normally ON switching means connected to a discharge path of the secondary battery, and for causing a current to flow in the discharging direction when turned on or blocking said discharge path in the discharging direction when turned off, said second switching means including a parasitic diode having a polarity so as to permit conduction in a charging direction when said second switching means is turned off;

control means for detecting a voltage of the secondary battery, and turning off said first switching means when said voltage of the secondary battery rises above a first reference voltage higher than a predetermined voltage close to a full-charge voltage or turning off said second switching means when said voltage of the secondary battery drops below a second reference voltage lower than a predetermined voltage close to a full-discharge voltage;

a first diode serially connected to said first switching means so as to have a conduction direction opposite to that of said parasitic diode of said first switching means; and a second diode serially connected to said second switching means so as to have a conduction direction opposite to that of said parasitic diode of said second switching means;

said charge path and said discharge path branching, in parallel, from between the secondary battery and one of input/output terminals of said charge path and said discharge path.

11. A device in accordance with claim 10, wherein the secondary battery comprises a serial connection of a plurality of secondary batteries, and wherein said control means, monitoring respective voltages across each of the individual secondary batteries, turns off said first switching means when the respective voltage across any one of said plurality of secondary batteries rises above said first reference voltage or turns off said second switching means when the respective voltage across any one of said plurality of secondary batteries drops below said second reference voltage.

12. A device in accordance with claim 10, wherein the secondary battery comprises a serial connection of a plurality of secondary batteries, and wherein said control means, monitoring a voltage across said serial connection, turns off said first switching means when said voltage across said serial connection rises above said first reference voltage or turns off said second switching means when said voltage across said serial connection drops below said second reference voltage.

13. A device in accordance with claim 10, wherein said control means, monitoring said voltage of the secondary battery, turns off said first switching means when said voltage of the secondary battery rises above said first reference voltage or turns off said second switching means when said voltage of the secondary battery drops below said second reference voltage.

14. A device in accordance with claim 10, wherein said charge path, on which said first switching means and said first diode are located, is connected in parallel with said discharge path, on which said second switching means and said second diode are located, and said charge path and said discharge path are each connected to one of a positive path and a negative path with respect to the secondary battery.

* * * * *